May 12, 1931.   A. J. FAIRBANKS   1,805,439
AIRCRAFT FITTING
Filed May 8, 1929
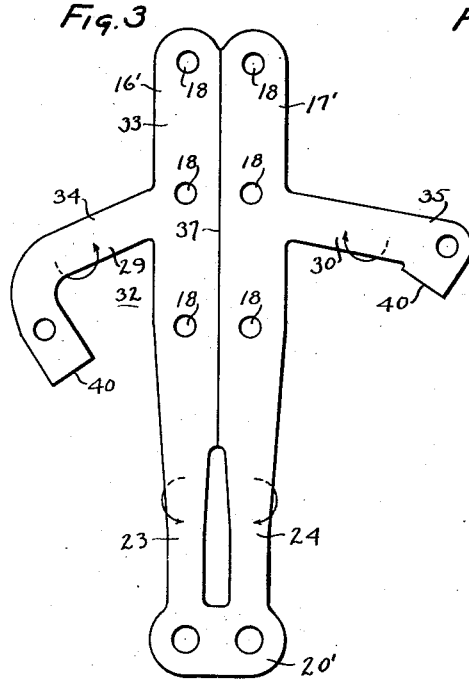
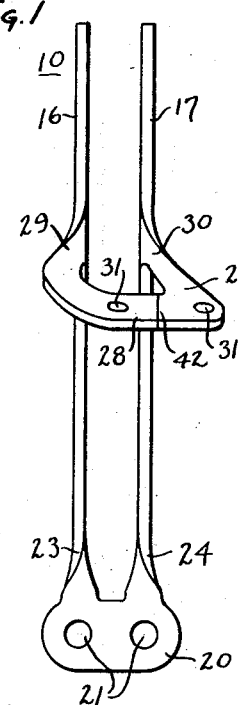
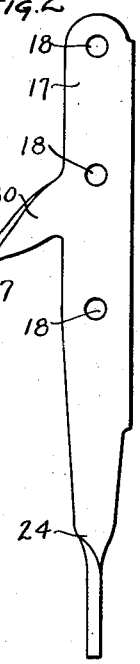
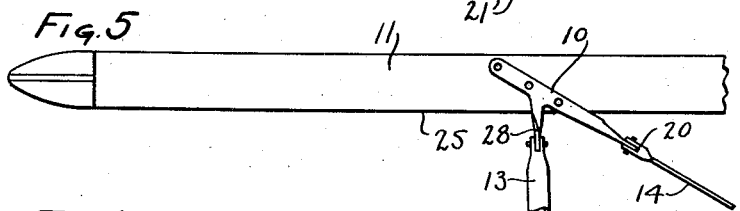
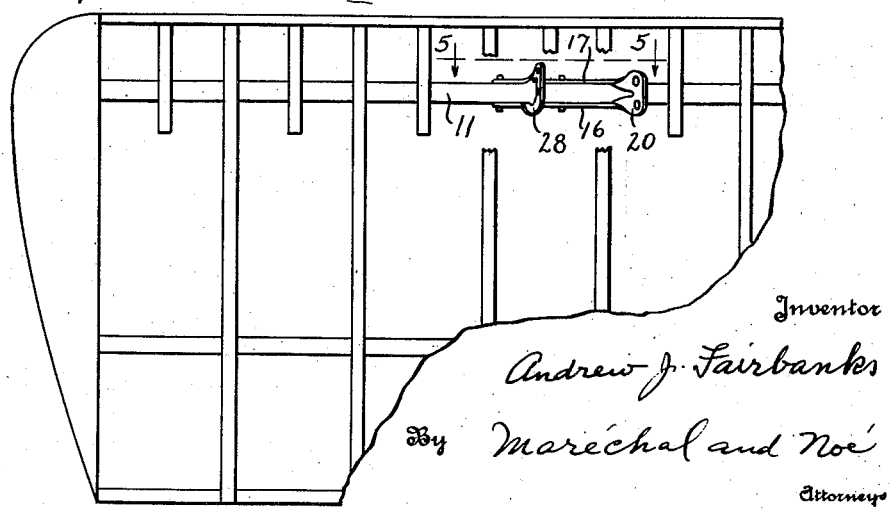
Inventor
Andrew J. Fairbanks
By Maréchal and Noé
Attorneys Patented May 12, 1931

1,805,439

UNITED STATES PATENT OFFICE

ANDREW J. FAIRBANKS, OF DAYTON, OHIO, ASSIGNOR, BY MESNE ASSIGNMENTS, TO CONSOLIDATED AIRCRAFT CORPORATION, OF BUFFALO, NEW YORK, A CORPORATION OF DELAWARE

AIRCRAFT FITTING

Application filed May 8, 1929. Serial No. 361,389.

This invention relates to aircraft, and more particularly to aircraft fittings such as are employed in the wings of aircraft or the like and which form anchorages for bracing or truss members.

One object of the invention is the provision of an airplane fitting of the character mentioned, which is of simple construction and economically made, and which provides a strong anchorage for truss members.

Another object of the invention is the provision of an airplane fitting having a pair of elongated straps adapted to extend along and project beyond opposite sides of an airplane spar or the like to provide an anchorage, a second anchorage being formed as a lug interconnecting the straps at a suitable location remote from the first anchorage mentioned.

Still another object of the invention is the provision of an airplane fitting which is constructed from a flat metal stamping and having twisted portions which are welded together to provide an anchorage which lies substantially in a plane inclined to the longitudinal axis of the fitting.

Other objects and advantages of the invention will be apparent from the following description and from the accompanying drawings, in which—

Fig. 1 is a front elevation of an airplane fitting embodying the present invention;

Fig. 2 is a side elevation of the fitting;

Fig. 3 is a view showing the stamping from which the fitting is formed;

Fig. 4 is a bottom plan view of an airplane wing structure showing a fitting in its relation to a wing spar; and Fig. 5 is a section on the line 5—5 of Fig. 4.

The accompanying drawings, to which reference is made by reference numerals, shows the fitting as it is used on a wing spar, although it should be understood that the fitting is adapted for other uses. The fitting, designated generally 10, is attached to the spar 11 of the wing which is designated generally 12, the fitting being so designed as to provide an anchorage for the strut, or a pair of struts 13 and an anchorage for a wire, or a pair of wires 14. The struts 13 may be the interplane struts, and the wires 14 the flying or landing wires of the wing trussing. The struts usually lie in a substantially vertical plane and the wires are usually arranged angularly between a pair of superimposed wings.

The fitting 10, as shown, embodies two elongated parallel straps 16 and 17 which are spaced apart the distance of the wing beam width and which are adapted to lie angularly along opposite sides of the wing beam. The straps 16 and 17 have a series of attaching holes 18 adapted to receive bolts which fasten the straps 16 and 17 securely in place. Preferably these bolts extend directly through both the straps and the wing beam. An anchorage 20 for the wires 14, shown as an integral part of the lower ends of both of the straps 16 and 17, is provided at one end of the fitting, the anchorage having preferably a pair of anchorage holes 21 adapted to receive the connecting pins or the like of the wires 14. This anchorage lies flat in a plane extending angularly to the wing beam axis, the lower ends of the straps being twisted as indicated at 23 and 24 so that the two straps which are positioned facing each other, are extended at their lower ends in a transverse direction. The two straps are secured to the wing beam so that they project considerably below the side 25 of the wing beam, the anchorage 20 being preferably in line with the longitudinal axis of the fitting straps so that the pull of the wires 14 is exerted in a straight line and assumed by the beam without creating any twisting tendencies.

Between the ends of the straps 16 and 17, the latter are connected along adjacent side edges by a lug designated generally 27, this lug forming a second attachment and adapted to be secured to the struts 13 or the like as previously mentioned. The outer end of the lug 27 forms an attachment 28 which lies in a plane inclined to the longitudinal axes of the straps 16 and 17, as clearly shown in Figs. 1 and 2, the lug 27 being twisted as indicated at 29 and 30 for this purpose. Attachment holes 31, shown as two in number, are provided on the attachment 28 so that the struts 13 may be connected to the fitting.

As shown in Fig. 4 the attachment 28 projects preferably at right angles to the wing beam axis where the struts are positioned vertically between a pair of planes, and the attachment 20 for the wires 14 extends angularly with relation to the wing beam axis, the two attachments 20 and 28 being rather remotely positioned on the fittings so that the line of forces through the struts and through the wires intersects substantially along the neutral axis of the wing beam 11. In this way twisting strains on the wing beam are avoided, and a simple and economical fitting is provided.

The fitting may be constructed as a casting or from drop forged parts suitably welded or connected together. For example, the lug 27 which provides the anchorage for the struts may be a twisted part of metal welded to both of the straps along adjacent edges of the latter. Preferably however the fitting is constructed of a single piece of metal which is made as a metal stamping having twisted portions and welded portions, providing a single integral rigid part. Fig. 3 shows the shape of a flat metal stamping from which the fitting shown in Fig. 1 may be made. This stamping, designated generally 32, is preferably a flat part of low carbon steel or the like having a body portion 33 and the two arm portions 34 and 35. The body portion is provided with the two series of holes 18 on the two strap portions 16' and 17'. The body portion 33 is sheared along the line 37 so as to separate the body into two separate parts connected only at their lower ends by the attachment portion 20'. Preferably a space 38 is provided just above the attachment portion 20' between the strap portions as shown in Fig. 3. The two strap portions are then twisted at 23 and 24 in opposite directions as indicated by the arrows in Fig. 3 so as to position the two straps 16 and 17 parallel or facing each other. The two arms 34 and 35 are then twisted at 29 and 30 as shown by the arrows in Fig. 3, the angularity of the arms originally being such that when the fitting is twisted at 23, 24, 29 and 30 the two ends 40 of these arms will abut, and these parts can then be welded together at 42 so as to make an integral rigid structure. The holes 31 provided between two arms 34 and 35 in the attachment 28 are preferably made at the time the metal is stamped out.

This single piece construction of the fitting is economical, and the fitting is very rigid and strong as the two straps are interconnected between their ends and tied rigidly together by the rigid interconnection provided by the attachment lug 27. The single weld at 42 has very little load as the forces applied by the struts are more or less directly assumed by the twisted part of the lug so that poor welding would not make the fitting unsafe.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An airplane fitting of the class described, comprising a pair of parallel elongated straps providing an anchorage at one end thereof, and a lug interconnecting said straps and extending out laterally therefrom and forming a second anchorage.

2. An airplane fitting of the class described, comprising a pair of parallel elongated straps providing an anchorage at one end thereof, and a lug interconnecting said straps and extending out laterally therefrom between the ends thereof to form a second anchorage remote from said first anchorage.

3. An airplane fitting of the class described, comprising a pair of parallel elongated metal straps providing an anchorage at an end thereof, a lug interconnecting said straps at points remote from said anchorage and extending out from said straps, said lug having a twisted portion so as to provide a flat anchorage end lying in a plane inclined to the longitudinal axes of said straps.

4. An airplane fitting of the class described, comprising a pair of straps, a lug interconnecting adjacent side edges of said straps between the ends of the straps, said lug extending out from said edges and having opposite twisted portions so that the end of the lug extends flatwise at an angle to said straps.

5. An airplane fitting of the class described, comprising a pair of spaced parallel straps having a series of openings arranged longitudinally therein, a lug interconnecting said straps and providing an anchorage extending outwardly from said straps and at an angle thereto, said lug having a pair of openings forming fastening means.

6. In combination, an airplane spar and a fitting comprising a pair of straps lying on opposite sides of said spar and extending at an angle to the spar and projecting angularly beyond a side of the spar, and a lug interconnecting said straps between the ends thereof and extending out beyond the said side of the spar to provide an anchorage.

7. An airplane fitting of the class described, comprising a pair of flat elongated straps, means interconnecting said straps at one end of the fitting to provide an anchorage, and a lug extending out from said straps between the ends thereof and forming a second anchorage.

8. An airplane fitting of the class described, comprising a pair of elongated flat metal straps having a series of attaching holes therein, means interconnecting said straps at one end of the fitting to provide an anchorage and a lug formed of a flat metal portion twisted to interconnect adjacent edges of said straps between the ends thereof.

9. An airplane fitting of the class described, comprising a pair of flat elongated parallel straps having a series of attaching holes therein, one end of each of said straps having an integral twisted portion providing an anchorage, and a lug formed of a twisted metal portion integrally interconnecting portions of said straps between the ends thereof and providing a second anchorage.

10. An airplane fitting of the class described formed as a single metal stamping twisted to the desired form and comprising a pair of parallel elongated straps lying flatwise with relation to each other and having twisted end portions providing an anchorage, adjacent edges of said straps each having an arm extending outwardly and having a twisted portion, the ends of the arms being fixed together and providing an anchorage.

11. A one piece airplane fitting of the class described formed as a metal stamping having twisted and welded portions comprising a pair of elongated flat straps having a series of attaching holes, and a lug extending outwardly from said straps between the ends thereof and interconnecting said straps at only one side of the fitting to provide an anchorage.

In testimony whereof I hereto affix my signature.

ANDREW J. FAIRBANKS.